(12) United States Patent
Khare et al.

(10) Patent No.: US 11,162,599 B2
(45) Date of Patent: Nov. 2, 2021

(54) VALVE FOR AIRCRAFT INFLATION SYSTEM

(71) Applicant: Goodrich Corporation, Charlotte, NC (US)

(72) Inventors: Akash Khare, Karnataka (IN); Poly Puthur John, Kerala (IN)

(73) Assignee: GOODRICH CORPORATION, Charlotte, NC (US)

( * ) Notice: Subject to any disclaimer, the term of this patent is extended or adjusted under 35 U.S.C. 154(b) by 148 days.

(21) Appl. No.: 16/547,472

(22) Filed: Aug. 21, 2019

(65) Prior Publication Data
US 2020/0393056 A1    Dec. 17, 2020

(30) Foreign Application Priority Data
Jun. 14, 2019  (IN) .............................. 201911023718

(51) Int. Cl.
| | |
|---|---|
| *F16K 17/06* | (2006.01) |
| *F16K 15/20* | (2006.01) |
| *F16K 31/60* | (2006.01) |
| *F16K 31/122* | (2006.01) |
| *B64D 25/14* | (2006.01) |
| *B63C 9/01* | (2006.01) |
| *B63C 9/00* | (2006.01) |
| *F16K 15/02* | (2006.01) |

(52) U.S. Cl.
CPC .............. *F16K 15/20* (2013.01); *B64D 25/14* (2013.01); *F16K 31/1221* (2013.01); *F16K 31/602* (2013.01); *B63C 9/01* (2013.01); *B63C 2009/007* (2013.01); *F16K 15/021* (2013.01)

(58) Field of Classification Search
CPC ...... F16K 15/20; F16K 15/021; F16K 31/602; F16K 31/1221; B64D 25/14; B63C 9/01; B63C 2009/007
USPC ............... 137/68.11, 205.5, 230, 233, 234.5, 137/315.35, 315.37, 495, 522, 523, 637.2, 137/543.21, 543.23; 251/82, 83, 114, 231
See application file for complete search history.

(56) References Cited

U.S. PATENT DOCUMENTS

| | | | | |
|---|---|---|---|---|
| 170,974 | A | * | 12/1875 | Westwater ............ F16K 15/063 137/543.13 |
| 1,846,315 | A | * | 2/1932 | Crowley ................. F16K 15/20 137/231 |
| 1,966,264 | A | * | 7/1934 | Roye ..................... F16K 15/063 251/332 |

(Continued)

*Primary Examiner* — Minh Q Le
(74) *Attorney, Agent, or Firm* — Cantor Colburn LLP

(57) ABSTRACT

Disclosed is a pneumatic inflation valve assembly, having: a valve housing defining a valve cavity and including an axial proximate end and an axial distal end, the proximate end including an outlet from the valve cavity and the distal end including an inlet into the valve cavity, the proximate end includes a motion hole, the distal end includes a receiving volume; and a poppet is disposed in the valve cavity that includes an axial proximate stem extending through the motion hole, an axial distal stem is disposed in the receiving volume and is moveable within the valve cavity between an opened position and a closed position, when the poppet is at the opened position the distal stem extends further into the receiving volume than at the closed position, and the center body is axially spaced from the proximate end and the distal end of the valve housing.

16 Claims, 7 Drawing Sheets

(56) References Cited

U.S. PATENT DOCUMENTS

| | | | | |
|---|---|---|---|---|
| 2,788,192 | A * | 4/1957 | Mountford | G05D 7/0126 |
| | | | | 251/63.5 |
| 3,480,035 | A * | 11/1969 | Szanto | F16K 15/20 |
| | | | | 137/234.5 |
| 3,640,501 | A * | 2/1972 | Walton | F16K 1/385 |
| | | | | 251/332 |
| 3,702,623 | A * | 11/1972 | Chacko | F16K 35/00 |
| | | | | 137/495 |
| 3,709,044 | A * | 1/1973 | Chacko | F16K 31/465 |
| | | | | 441/96 |
| 3,782,413 | A * | 1/1974 | Chacko | F16K 35/00 |
| | | | | 137/223 |
| 4,595,374 | A | 6/1986 | Wass | |
| 5,009,249 | A * | 4/1991 | Fisher | B63C 9/24 |
| | | | | 137/495 |
| 5,169,119 | A * | 12/1992 | Duggal | A62B 9/02 |
| | | | | 251/74 |
| 6,105,600 | A * | 8/2000 | Wang | B60S 5/04 |
| | | | | 137/231 |
| 6,321,770 | B1 * | 11/2001 | Hintzman | B64D 25/14 |
| | | | | 137/68.23 |
| 6,467,751 | B1 | 10/2002 | Korpanty et al. | |
| 7,299,816 | B2 * | 11/2007 | Rouleau | F16K 13/04 |
| | | | | 137/68.3 |
| 7,854,347 | B2 * | 12/2010 | Wang | B63C 9/24 |
| | | | | 222/5 |
| 2004/0195457 | A1 * | 10/2004 | Baker | C06D 5/04 |
| | | | | 244/137.2 |
| 2012/0012190 | A1 | 1/2012 | Barber | |
| 2020/0094976 | A1 * | 3/2020 | John | A62B 1/20 |
| 2020/0300380 | A1 * | 9/2020 | John | F16K 31/143 |

\* cited by examiner

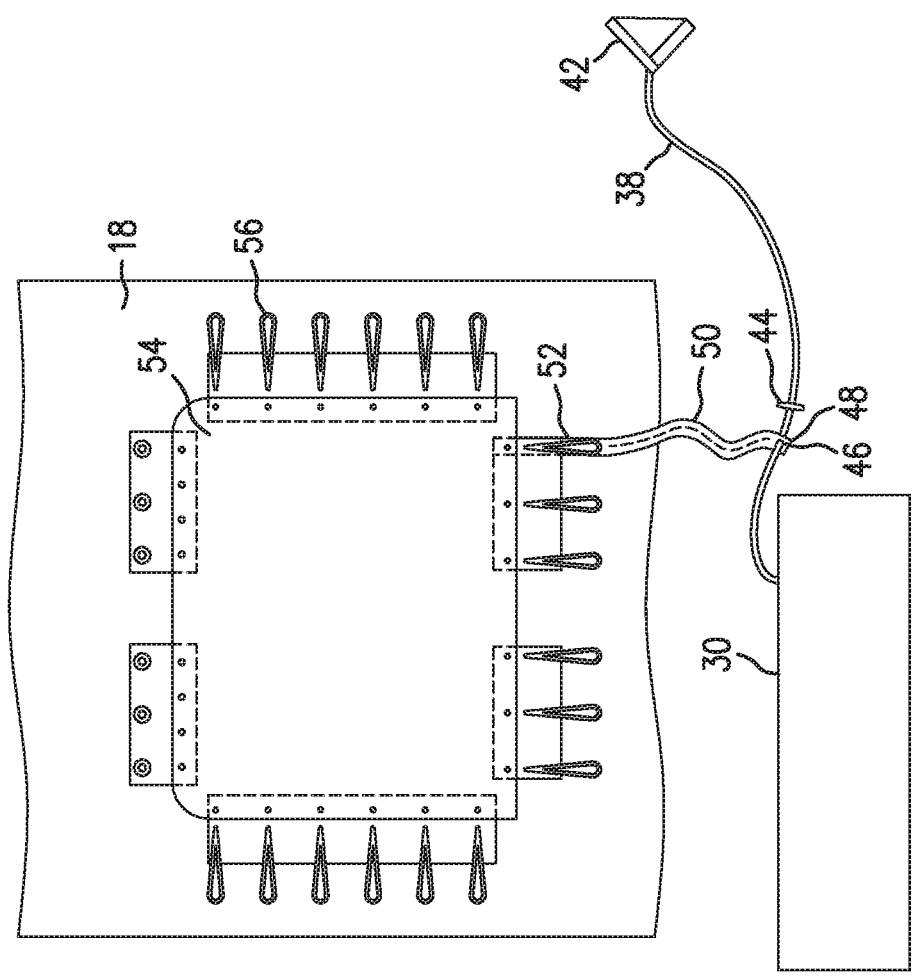

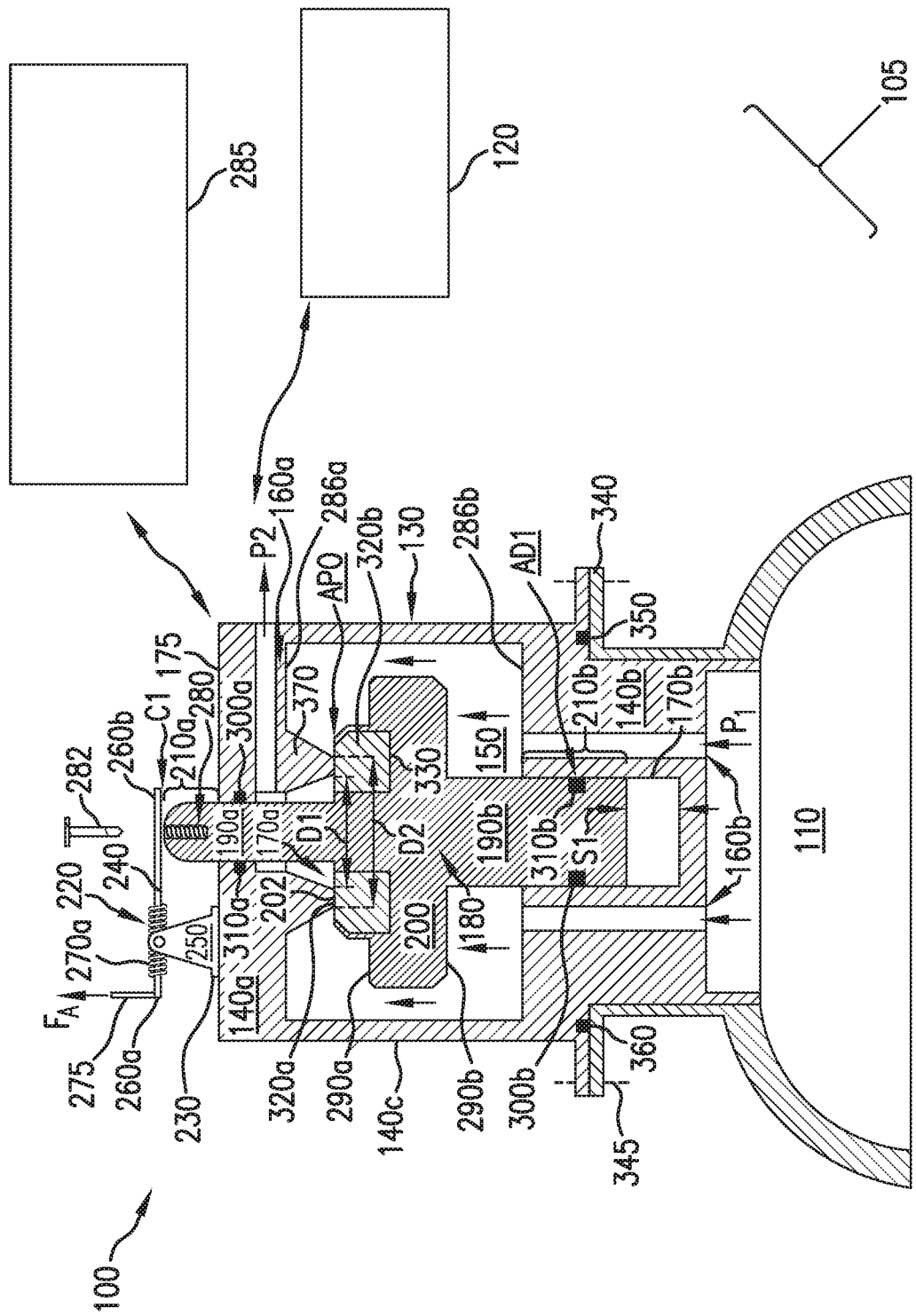

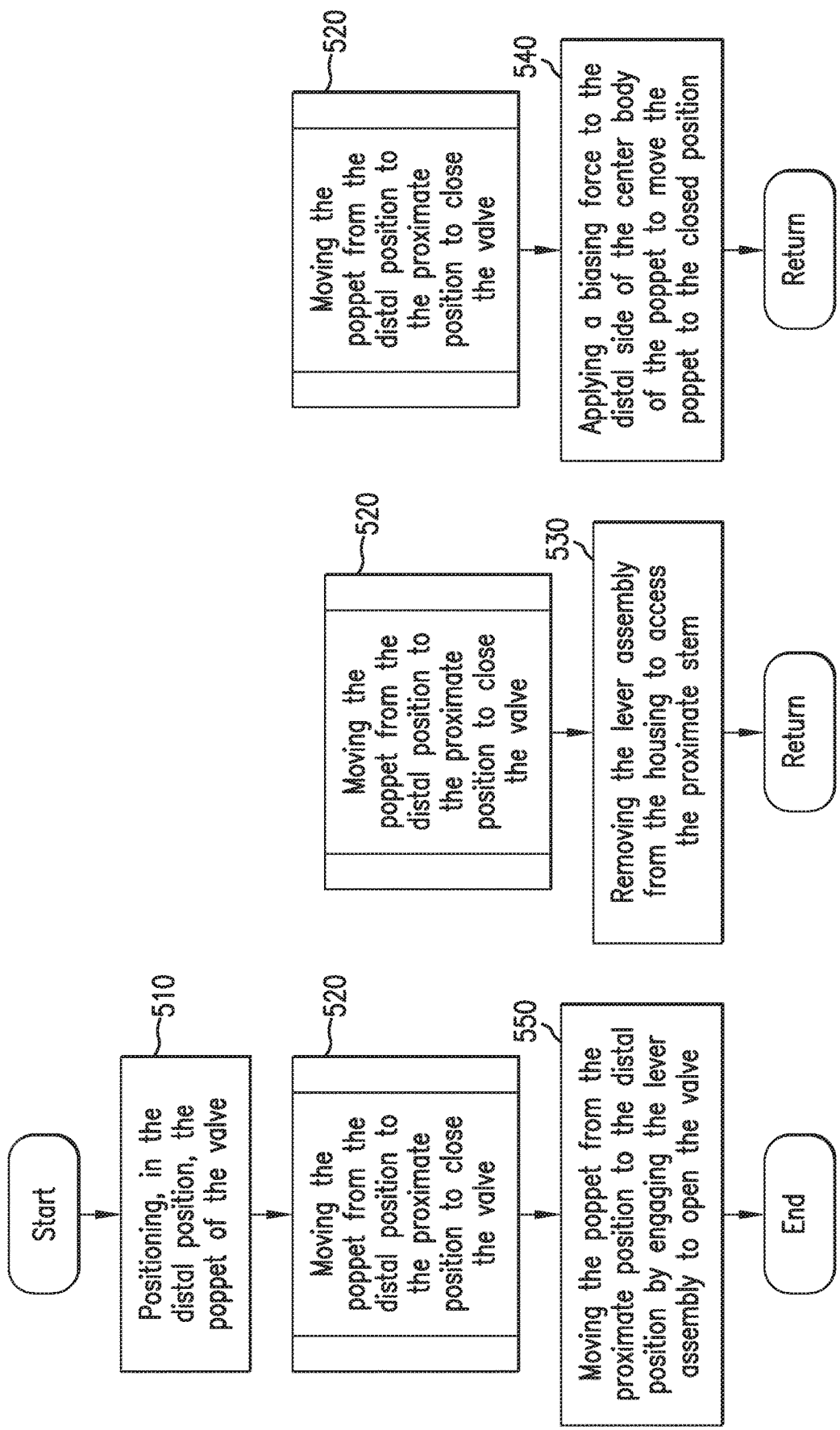

VALVE FOR AIRCRAFT INFLATION SYSTEM

CROSS-REFERENCE TO RELATED APPLICATION

This application claims the benefit of Indian Patent Application No. 201911023718 filed Jun. 14, 2019, which is incorporated herein by reference in its entirety.

BACKGROUND

Exemplary embodiments pertain to the art of valves and more specifically to a valve for an aircraft inflation system During an airline emergency at take-off and landing, swift removal of the passengers may be required from the aircraft because of the potential of injuries from fire, explosion, or sinking in water. A conventional method of quickly evacuating a large number of passengers from an aircraft is to provide multiple emergency exits, each of which is equipped with an inflatable evacuation slide. Inflatable evacuation slides are normally stored in an uninflated condition in a container, or packboard, requiring a minimum of space in the interior of the aircraft and are typically mounted on or adjacent to the interior of the aircraft exit door.

A system for inflating an evacuation slide may consist of a pressurized cylinder, a regulating valve, high pressure hoses and aspirators. The cylinder can be filled with can be pressurized gaseous Nitrogen ($N_2$), or a mixture of Carbon Dioxide ($CO_2$) and Nitrogen. The $CO_2$ may be used to slow down the rate at which the valve expends the gases. In some designs, when the slide is in the armed position and an aircraft door is opened, the slide pack falls free of the door bustle (a semi-rigid outer container) and weight and momentum of the slide pulls a lanyard from the valve. Pulling the lanyard initiates the flow of gas to inflate the slide.

BRIEF DESCRIPTION

Disclosed is a pneumatic inflation valve assembly, comprising: a valve housing defining a valve cavity, the valve housing including an axial proximate end and an axial distal end, the proximate end including an outlet from the valve cavity and the distal end including an inlet into the valve cavity, the proximate end includes a motion hole formed through it, the distal end includes a receiving volume defined therein; and a poppet disposed in the valve cavity, the poppet including an axial proximate stem extending through the motion hole, an axial distal stem at least partially disposed in the receiving volume, the poppet being moveable within the valve cavity between an opened position and a closed position, wherein: when the poppet is at the opened position the distal stem extends further into the receiving volume than when the poppet is at the closed position, and the center body is axially spaced from the proximate end of the valve housing and the distal end of the valve housing.

In addition to one or more of the above disclosed features, or as an alternate, the assembly includes a lever assembly mounted to the proximate exterior surface of the valve housing, the lever assembly configured to operationally engage the proximate stem to selectively move the poppet from the closed position to the opened position.

In addition to one or more of the above disclosed features, or as an alternate, the lever assembly includes an axial proximate biasing member that urges the lever assembly against engaging with the poppet.

In addition to one or more of the above disclosed features, or as an alternate, the proximate biasing member is a torsional spring.

In addition to one or more of the above disclosed features, or as an alternate, the proximate stem includes an axial proximate tip orifice to engage with a tool to close the valve.

In addition to one or more of the above disclosed features, or as an alternate, the proximate tip orifice is a threaded blind-hole.

In addition to one or more of the above disclosed features, or as an alternate, the assembly includes an axial distal biasing member disposed between an axial distal surface of the valve cavity and an axial distal side of the center body of the poppet, the distal biasing member configured to move the poppet from the opened position to the closed position, to thereby close the valve.

In addition to one or more of the above disclosed features, or as an alternate, the assembly includes a plurality of seal members, including: an axial proximate o-ring in the motion hole, operationally engaging the proximate stem and the motion hole; and an axial distal o-ring, operationally engaging the distal stem and the receiving volume; and an annular body seal for the poppet operationally engaging an axial proximate side of the center body and an annular seal land at a distal segment of the motion hole.

In addition to one or more of the above disclosed features, or as an alternate, the assembly includes an axial distal flange for being positioned against a gas supply container and a flange o-ring for operationally engaging the distal flange and the gas supply container.

In addition to one or more of the above disclosed features, or as an alternate, the center body of the poppet is disc shaped, having a cross-sectional area that is larger than the distal stem.

In addition to one or more of the above disclosed features, or as an alternate, the outlet fluidly connects with the motion hole between the annular seal land and the proximate o-ring.

In addition to one or more of the above disclosed features, or as an alternate, the motion hole has a frustoconical profile between the outlet and the annular seal land which diverges toward the annular seal land, thereby defining an inner diameter of the annular seal land.

In addition to one or more of the above disclosed features, or as an alternate, an annular boss extends distally from an axial proximate surface of the valve cavity, wherein an outer profile of the annular boss converges toward the distal segment of the motion hole, thereby defining an outer diameter of the annular seal land.

In addition to one or more of the above disclosed features, or as an alternate, a contact surface area between the annular body seal for the poppet and the annular seal land is AP0; a contact surface area between the proximate o-ring and the poppet is AP1; a contact surface area between the distal o-ring and the poppet is AD1; wherein: AP0>AD1; and a cross-sectional area of the distal stem is greater than a cross-sectional area of the proximate stem, whereby AD1>AP1.

In addition to one or more of the above disclosed features, or as an alternate, an egress system of an aircraft is disclosed, comprising: an evacuation slide; a gas supply container to inflate the evacuation slide; and a pneumatic inflation valve assembly fluidly connecting the gas supply container to the evacuation slide, the assembly including: a valve housing defining a valve cavity, the valve housing including an axial proximate end and an axial distal end, the proximate end including an outlet from the valve cavity and the distal end including an inlet into the valve cavity, the proximate end includes a motion hole formed through it, the distal end includes a receiving volume defined therein; and a poppet disposed in the valve cavity, the poppet including an axial proximate stem extending through the motion hole, an axial distal stem at least partially disposed in the receiving volume, the poppet being moveable within the valve cavity between an opened position and a closed position, wherein: when the poppet is at the opened position the distal stem is displaced further into the receiving volume than when the poppet is at the closed position, and the center body is axially spaced from the proximate end of the valve housing and the distal end of the valve housing. In addition to one or more of the above disclosed features, or as an alternate, the system includes a lever assembly mounted to the proximate exterior surface of the valve housing, the lever assembly configured to operationally engage the proximate stem to selectively move the poppet from the closed position to the opened position.

Further disclosed is a method of operating a pneumatic inflation valve assembly comprising: positioning a poppet of the valve in an opened position, wherein a center body of the poppet in a valve cavity of the valve housing is spaced from an axial distal end of the valve housing and an axial proximate end of the valve housing, and an axial distal stem of the poppet extends into a receiving volume in the axial distal end of the valve housing; and moving the poppet from the opened position to an axial closed position, wherein the center body is positioned to fluidly seal a motion hole of the axial proximate end of the valve housing and the axial distal stem of the poppet extends into the receiving volume in the axial distal end of the valve housing, wherein when the poppet is at the opened position the distal stem extends further into the receiving volume than when the poppet is at the closed position.

In addition to one or more of the above disclosed features, or as an alternate, moving the poppet from the opened position to the closed position comprises: removing a lever assembly from the proximate exterior surface of the valve housing to access the proximate portion of the proximate stem; and applying a biasing force to the proximate portion of the proximate stem to move the poppet from the opened position to the closed position.

In addition to one or more of the above disclosed features, or as an alternate, the method includes moving the poppet from the closed position to the opened position by engaging the lever assembly to apply a biasing force to the proximate stem when the proximate stem axially extends from the motion hole, axially beyond the proximate end of the valve housing.

In addition to one or more of the above disclosed features, or as an alternate, wherein moving the poppet from the opened position to the closed position comprises: applying a biasing force to an axial distal side of the center body of the poppet to move the poppet from the opened position to the closed position.

BRIEF DESCRIPTION OF THE DRAWINGS

The following descriptions should not be considered limiting in any way. With reference to the accompanying drawings, like elements are numbered alike:

FIG. 2 shows an inflator of a slide assembly which may incorporate features of the disclosed embodiments;

FIGS. 3a, 3b and 3c, respectively show a valve in a closed state, an opened state, and again in an opened state wherein geometric sizes of various features and various pressures and forces acting within and against the valve are shown, according to a disclosed embodiment;

FIGS. 5a-5c show methods of operating a valve according to a disclosed embodiment.

DETAILED DESCRIPTION

A detailed description of one or more embodiments of the disclosed apparatus and method are presented herein by way of exemplification and not limitation with reference to the Figures.

Figure 1:
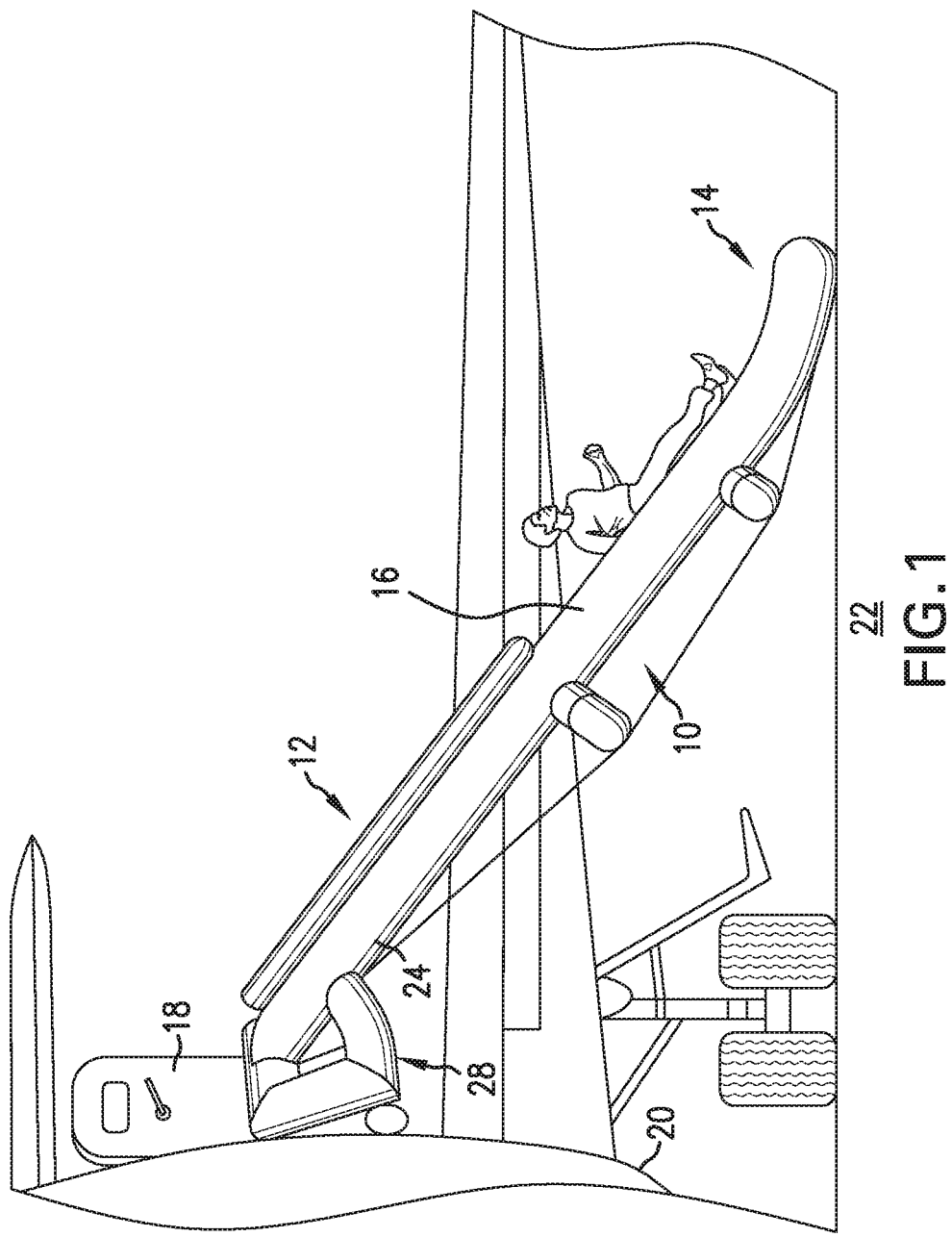
FIG. 1 shows an inflatable evacuation slide assembly which may incorporate features of the disclosed embodiments.

FIG. 1 shows a (known) inflatable evacuation slide assembly (slide assembly) 10. The slide assembly 10 generally comprises a head end 12 and a foot end 14. The head end 12 is configured to couple the slide assembly 10 to an exit door 18 of an aircraft 20 while the foot end 14 is in contact with the ground 22 such that the slide assembly 10 provides a sloping surface to permit the rapid egress of passengers from the aircraft 20. The slide assembly 10 is preferably fabricated from an air impervious material such as a lightweight fabric that has been coated with an elastomer such as rubber or urethane. The various parts of the slide assembly 10 may be joined together with a suitable adhesive whereby the structure will form a unitary composite structure capable of maintaining its shape during operation. The entire structure of the slide assembly 10 is preferably formed such that all the chambers comprising the structure interconnected pneumatically, such that a single pressurized gas source, such as compressed carbon-dioxide, nitrogen, argon, a pyrotechnic gas generator, or hybrid pyrotechnic/compressed gas generator may be utilized for its deployment. The main body of the slide assembly 10 comprises a plurality of inflatable beams 16 including a pair of longitudinally extending rail tubes 24 that extend from the head end truss assembly 28 to the ground 22.

FIG. 2 schematically shows a (known) inflator 30 associated with the slide assembly 10. The inflator 30 may include a supply of compressed gas, pyrotechnic, or a hybrid inflation system consisting of a stored compressed gas and pyrotechnic generator, or other existing or future source of inflation gas. The inflator 30 may further include a valve which may be normally closed for storage. The valve may be activated by withdrawing a manual initiation lanyard (lanyard) 38. The lanyard 38 includes a pull handle 42 and a mechanical stop 44. The pull handle 42 may be a fabric loop, plastic handle or other suitable handle to enable flight attendant to initiate inflation of the emergency evacuation slide in the event of a failure of automatic inflation. The mechanical stop 44 may be a suitable ferrule crimped onto the lanyard 38, a knot tied in the lanyard 38, or other fitting for enlarging the cross-section of the lanyard 38 for preventing it from passing through an aperture. The lanyard 38 passes through a grommet 46 located between the mechanical stop 44 and the inflator 30. The grommet 46 reinforces an axial distal end 48 of an automatic initiation lanyard 50 which has an axial proximal end 52 attached to the packboard 54 which, in turn, is mounted to the exit door 18. The packboard 54 retains the inflator 30 and the slide assembly 10 (FIG. 1) in the uninflated folded condition for storage by means of conventional speed lacing 56.

Known valves for the inflator 30 may be in the form of a typical spool or poppet valve. Typical valves may have relatively complex designs. In addition, typical valves may become more challenging to actuate when utilized in an environment with relatively large gas pressure, for example when fitted to inflate larger evacuation slides. Further, when typical valves are actuated for any reason, the valves need to be substantially disassembled for resetting to a pre-actuated configuration, making routine health checks difficult to perform.

Figure 3A:
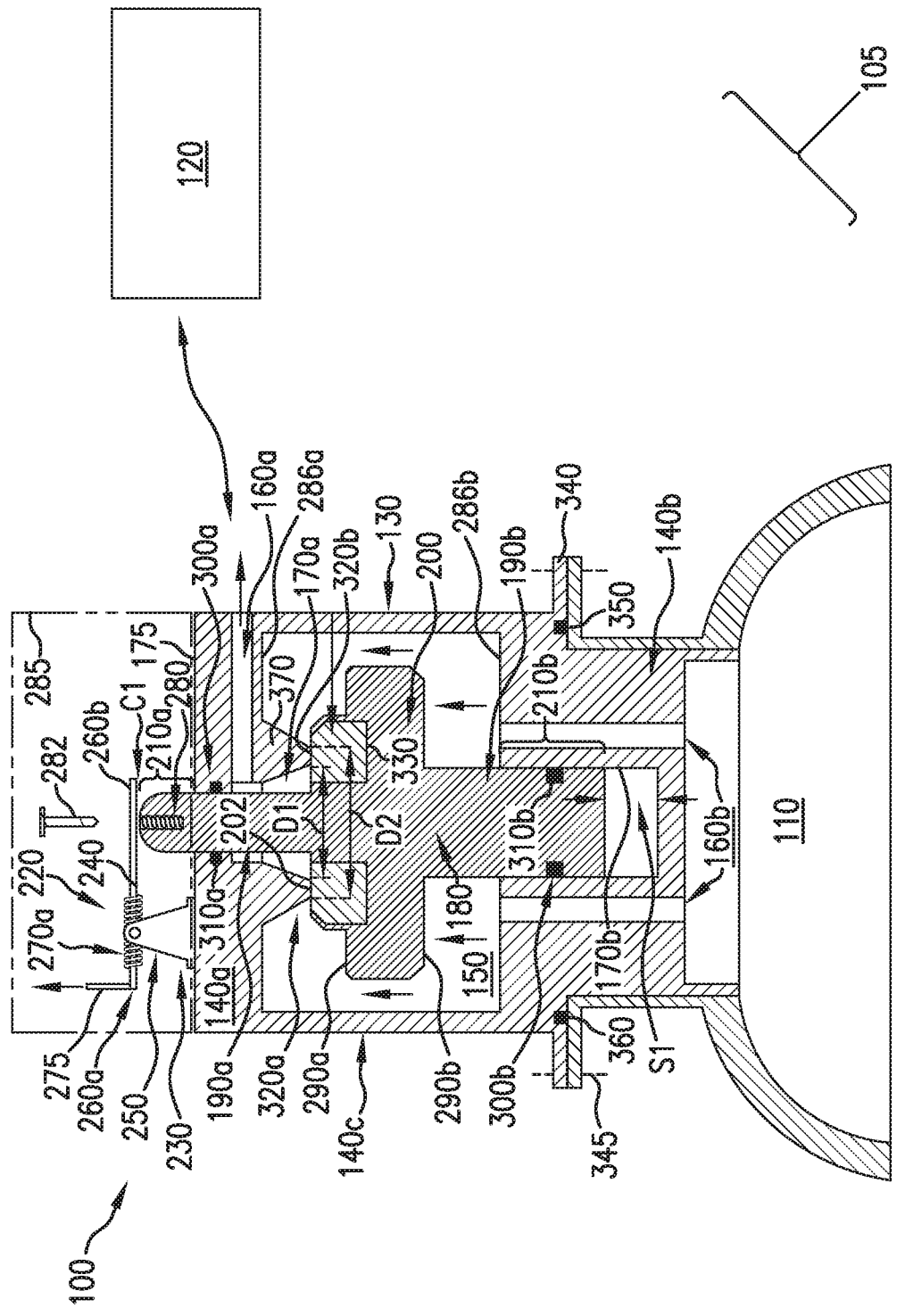
Figure 3B:
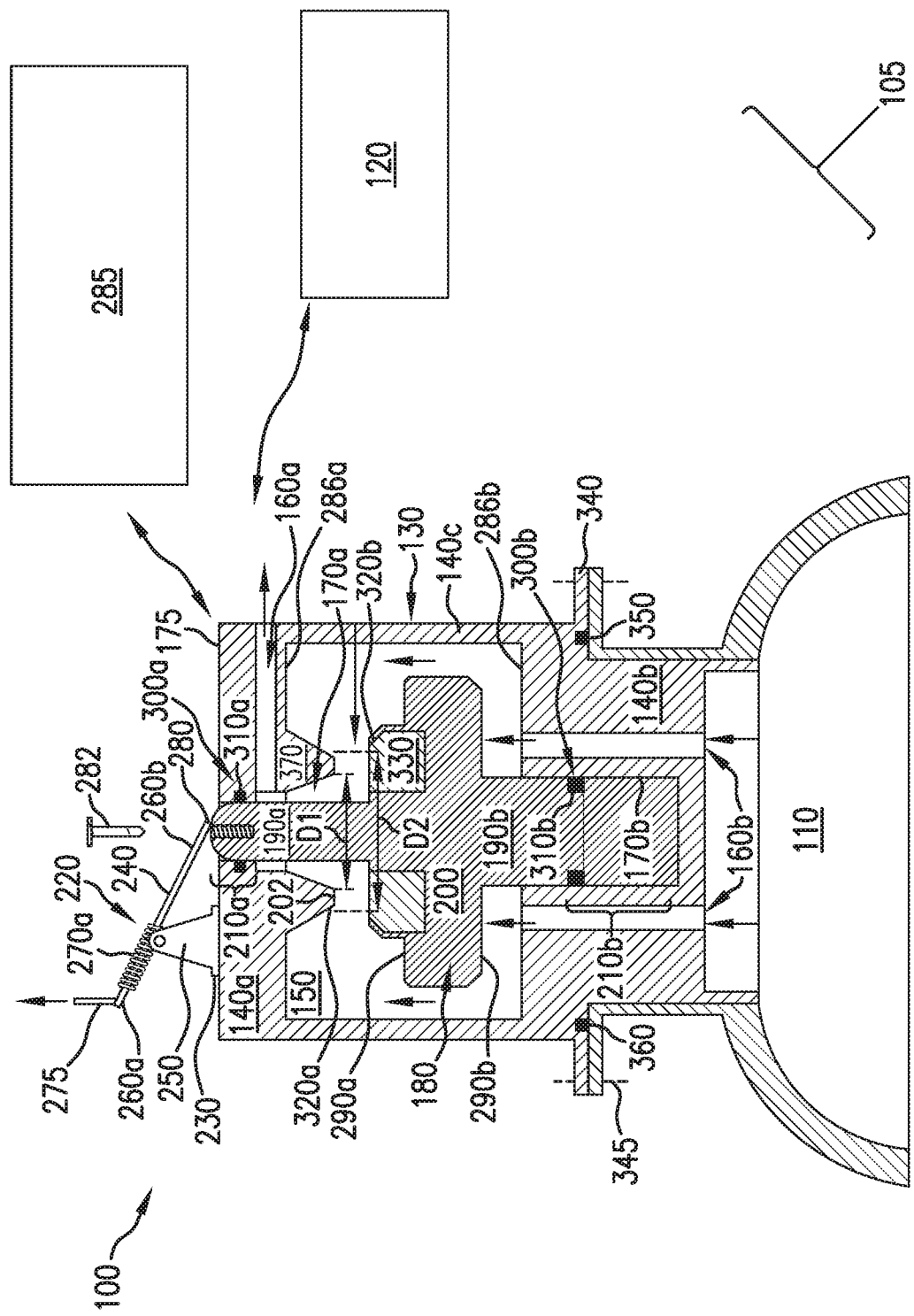

In view of the constraints of known valve design, a pneumatic inflation valve assembly (valve 100) according to an embodiment is illustrated in FIGS. 3a-3c.

The valve 100 may be integrated into an egress system 105 of an aircraft, to fluidly connect a supply of gas of a gas supply container 110 with an evacuation slide 120. The valve 100 includes a valve housing 130 with a first end that is an axial proximate end 140a and a second end that is an axial distal end (distal end) 140b and which is axially spaced from the proximate end 140a. A circumferential wall 140c connects the proximate end 140a and the distal end 140b to define a valve cavity 150 there between.

It is to be appreciated that proximate and distal as used herein is for reference only and not intended on limiting an orientation or utilization of the disclosed embodiments. Proximate as used herein may be alternatively construed as "top" or "above" (or similar) and distal may be construed as "bottom" or "below" (or similar). For example, in FIG. 3a, the proximate end 140a is a "top" end that is "above" the distal end 140b (which, in turn, is a "bottom" end that is "below" or "beneath" the proximate end 140a).

The valve cavity 150 includes an outlet 160a, an inlet 160b, an axially extending motion hole 170a. The motion hole 170a is radially centered in the proximate end 140a of the valve housing 130, between the valve cavity 150 and an axial proximate exterior surface 175 of the valve housing 130. The motion hole 170a is fluidly connected to the outlet 160a. An axially extending receiving volume 170b is a radially centered hole extends from the valve cavity 150, partially through the distal end 140b of the valve housing 130. In an embodiment, the outlet 160a extends in a radial direction in the proximate end 140a of the valve housing 130, axially between an exterior side of the valve housing 130 and the motion hole 170a. The inlet 160b may comprise a plurality of axially extending through-holes disposed circumferentially and/or radially about the receiving volume 170b. During normal use, when the valve 100 is closed, the outlet 160a in the valve housing 130 is fluidly sealed from the valve cavity 150, the gas supply container 110 is filled (charged), and the valve cavity 150 is at the same pressure as the gas supply container 110.

The valve 100 includes a poppet 180. The poppet 180 includes a first stem that is an axially extending proximate stem 190a disposed within the motion hole 170a. A second stem is an axially extending distal stem 190b disposed within the receiving volume 170b. A center body 200 is axially intermediate the proximate stem 190a and distal stem 190b and disposed within the valve cavity 150. The poppet 180 is moveable between a first position which is an opened position (FIG. 3b) and a second position which is a closed position (FIGS. 3a and 3c). When the poppet 180 is at the opened position, the center body 200 of the poppet 180 is axially spaced from the proximate end of the valve housing 130 and more specifically from an axial distal segment (distal segment) 202 of the motion hole 170a. The center body 200 is also axially spaced from the axial distal end of the valve housing 130 within the valve cavity 150. An axial proximate portion 210a of the proximate stem 190a is substantially within the motion hole 170a when the poppet 180 is in the opened position.

When the poppet 180 is at the closed position, the center body 200 is axially against the distal segment 202 of the motion hole 170a so that the outlet 160a is fluidly sealed. Further, the proximate portion 210a of the proximate stem 190a axially extends from the motion hole 170a, beyond the proximate exterior surface 175 of the valve housing 130. The valve 100 is configured so that at least an axial distal portion 210b of the distal stem 190b is within the receiving volume 170b throughout a complete stroke span S1 of the valve 100, and the distal stem 190b does not axially bottom-out in the receiving volume 170b during the stroke of the valve 100.

The valve 100 includes a manually actuated lever assembly (lever assembly) 220 mounted, for example by screws 230, to the proximate exterior surface 175 of the valve housing 130. The lever assembly 220 is configured to operationally engage the proximate portion 210a of the proximate stem 190a to selectively move the poppet 180 from the closed position to the opened position, to thereby open the valve 100. For example, a lever arm 240 extends in opposing directions from a fulcrum 250 of the lever assembly 220 to define an input side 260a and an output side 260b. The output side 260b is operationally positioned against the proximate portion 210a the proximate stem 190a, and spaced by a predetermined axial clearance C1 to avoid accidentally engaging the poppet 180. The clearance C1 is provided by an axial proximate biasing member 270a that urges the lever assembly 220 away from engaging the poppet 180. The proximate biasing member 270a may be a torsional spring.

The input side 260a of the lever arm 240 is configured for being manually biased, for example by a pull cable 275, in the proximate direction, to manually advance the output side 260b against the poppet 180. This action axially advances the poppet 180 in the distal direction to thereby open the valve 100 (FIG. 3b). In use, the lever assembly 220 may be enclosed within a structural cover 285 (illustrated as attached to the valve 100 in FIG. 3a and removed from the valve in FIGS. 3b and 3c) to avoid unintended actuation.

In the embodiments in FIGS. 3a-3c, the proximate portion 210a of the proximate stem 190a includes an axial proximate tip orifice 280 that is configured for being engaged when the poppet 180 is in the opened position to move the poppet 180 to the closed position. This action closes the valve 100, for example to reset the valve 100. The proximate tip orifice 280 is a threaded blind-hole and the valve 100 includes a threaded pin 282 configured for engaging the proximate tip orifice 280 to move the poppet 180 to the closed position. Such action may occur when the gas supply in the gas supply container 110 is relatively depleted to minimize required forces for closing the valve 100. The lever assembly 220 may be disassembled to provide access to the proximate tip orifice 280.

The valve system includes a plurality of o-ring seals (generally referred to as 300) that prevent gas from escaping from around the valve housing 130. A first o-ring which is an axial proximate o-ring 300a is engagingly disposed between the proximate stem 190a of the poppet 180 and the motion hole 170a. The proximate o-ring 300a is within a first groove which is an axial proximate groove 310a formed in the motion hole 170a. Further, the proximate o-ring 300a is located axially within the valve 100 between the outlet 160a and the proximate exterior surface 175 of the valve housing 130. A second o-ring which is an axial distal o-ring (distal o-ring) 300b is disposed between the distal stem 190b of the poppet 180 and the receiving volume 170b of the valve housing 130. The distal o-ring 300b is within a second groove which is an axial distal groove 310b formed within the distal stem 190b of the poppet 180.

An annular seal land 320a at the distal segment 202 of the motion hole 170a (for example, the bottom segment 202 of the motion hole 170a) operationally engages, for example by pressing against, an annular body seal 320b disposed in an annular groove 330 formed in the proximate side 290a of the center body 200. The center body 200 of the poppet 180 is disc shaped, having a cross-sectional area that is larger than the distal stem 190b, and the annular body seal 320b defines a planar profile for the proximate side 290a of the center body 200. The annular body seal 320b is soft relative to a hard surface of the annular seal land 320a. This configuration fluidly seals the valve cavity 150 from the outlet 160a of the valve housing 130 when the valve 100 is closed. The annular body seal 320b may be a polymer seal to achieve a leak tightness over wide range of operating temperatures.

The valve 100 may further include an axial distal flange (distal flange) 340 configured for being positioned against the gas supply container 110 and secured thereto with, for example screws 345. A flange o-ring 350 may be provided for operationally engaging the distal flange 340 and the gas supply container 110. A flange groove 360 may be formed in the distal flange 340 for seating the flange o-ring 350.

The outlet 160a fluidly connects with the motion hole 170a between the annular seal land 320a and the proximate o-ring 300a, and the motion hole 170a has a frustoconical profile therebetween, diverging toward the distal segment 202 of the motion hole 170a, for example at the annular seal land 320a. This configuration defines an inner diameter D1 of the annular seal land 320a. An annular boss 370 extends distally from a first surface of the valve cavity 150 which is an axial proximate surface 286a of the valve cavity 150 to form the distal segment 202 of the motion hole 170a. A radial outer profile of the annular boss 370 converges toward the distal segment 202, thereby defining an outer diameter D2 of the annular seal land 320a at the distal segment 202 of the motion hole 170a. It is to be appreciated that a radial inner profile of the annular boss 370 forms the frustoconical profile in the motion hole 170a that extends between the outlet 160a and the annular seal land 320a.

According to an embodiment, as further illustrated FIG. 3c, a contact surface area between the annular body seal 320b and the annular seal land 320a is AP0, a contact surface area between the proximate stem 190a and the proximate o-ring 300a is AP1 and a contact surface area between the distal stem 190b and the distal o-ring 300b is AD1. In one embodiment AP0>AD1 and a cross-sectional area of the distal stem 190b is greater than a cross-sectional area of the proximate stem 190a, whereby AD1>AP1.

Further, when the valve 100 is closed (FIG. 3c), pressure P1 from the gas supply container 110, acting through the inlet 160b, forces the center body 200 of the poppet 180 in the proximate direction. This results in the annular body seal 320b engaging the annular seal land 320a to thereby create a fluid seal within the valve cavity 150 and close the valve 100. When the valve 100 is closed, reaction forces tend to push the poppet 180 assembly distally, for example in the opening direction. The reaction force acts against both the distal o-ring 300b and the proximate o-ring 300a. For example, the following represents the forces acting within the valve 100:

Fc is the net force acting on the valve that tends to close the valve 100;

Fo is the net force acting on the valve that tends to open the valve 100; and

Ff is the net friction force generated by the o-rings 300 when creating a dynamic seal in reaction to gas pressure tending to close the valve 100.

As indicated, AP0>AD1>AP1, so that while the valve 100 is closed, a force balance provides that the net closing force is:

$$Fc(net)=(P1 \times AP0)-(P1 \times AD1)$$

In addition, in order to actuate the lever assembly 220 using an applied force Fa, for example manually, the following force balance applies:

$$Fa=Fc+Ff$$

Once the valve 100 is opened, the forces between the annular body seal 320b and the annular seal land 320a are eliminated because there is no contact therebetween. In this configuration, fluid pressure acts on the distal o-ring 300b to tend to open the valve 100 and fluid pressure acts on the proximate o-ring 300a to tend to close the valve 100. As AD1>AP1, the net force will sustain an opened state of the valve 100. Thus, when the valve 100 is opened, pressure P1 at the inlet 160b is greater than pressure P2 outlet 160a, or P1>P2. Thus, when the valve 100 is opened, the force balance provides that the net opening force is:

$$Fo=P1 \times AD1$$

$$Fc=P2 \times AP1$$

$$Fo(net)=Fo-Fc$$

It is to be appreciated from the above relationships that various features of the valve 100 may be resized as design constraints require, including sizes of the proximate stem 190a, the distal stem 190b, the inlet 160b, the outlet 160a, the annular body seal 320b, the annular seal land 320a, and the lever biasing member 270. A desired outcome of the relative sizings is to generate forces that maintain a closed state for the valve 100 as well as an opened state for the valve 100. In addition, the sizings are selected so that an actuating force which may be a manual actuating force for the lever assembly 220 is within predetermined limits, so that the valve 100 may be easily tested and reset.

Figure 4:
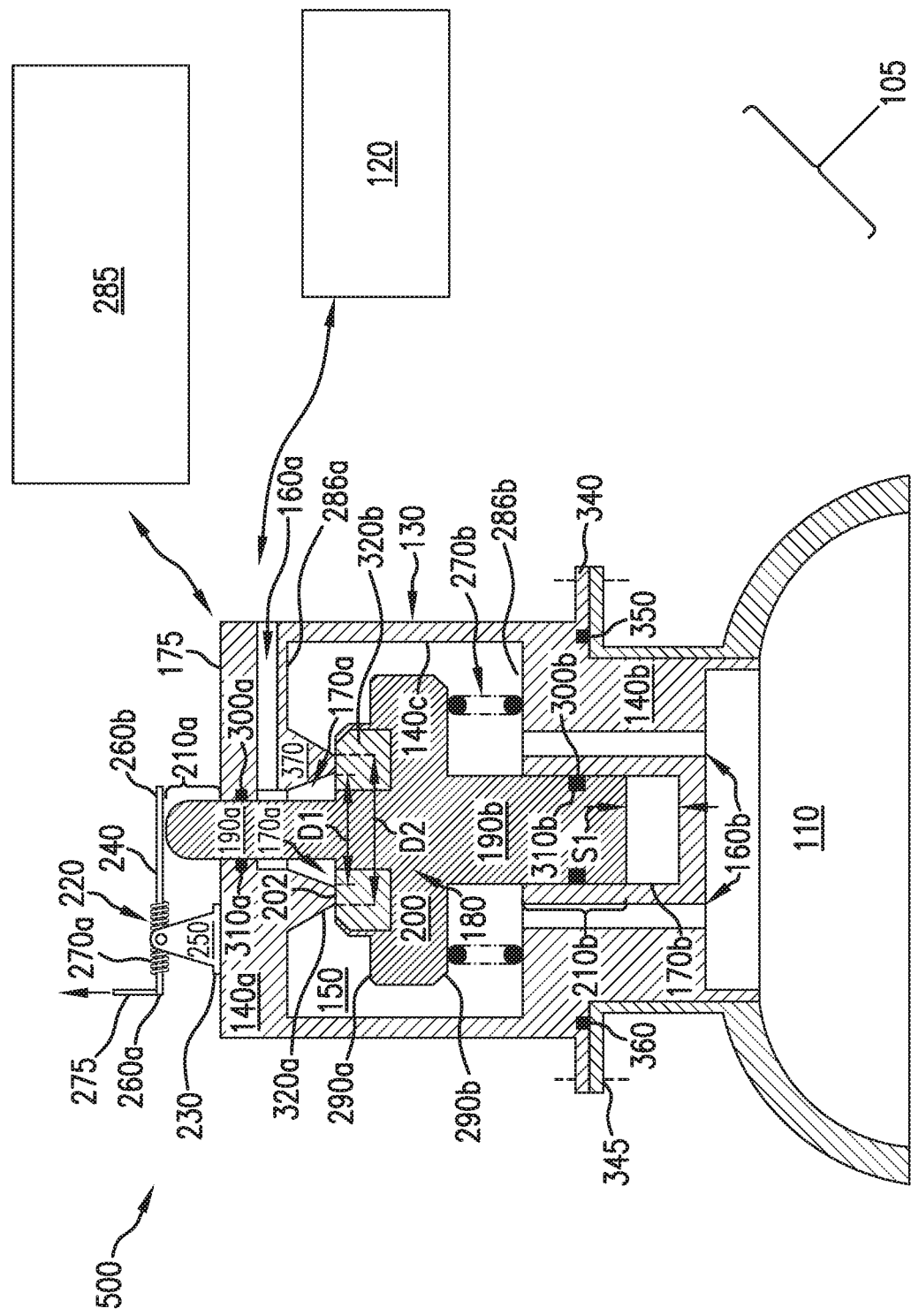
FIG. 4 shows another valve according to a disclosed embodiment.

Turning now to FIG. 4, another embodiment of the valve 100 is illustrated. Features of the valve 100 having the same description and element identifiers as illustrated in FIGS. 3a-3c shall be similarly construed unless otherwise indicated.

The valve 100 may be integrated into an egress system 105 of an aircraft, to fluidly connect a supply of gas of a gas supply container 110 with an evacuation slide 120. The valve 100 includes a valve housing 130 with a first end that is an axial proximate end 140a and a second end that is an axial distal end (distal end) 140b and which is axially spaced from the proximate end 140a. A circumferential wall 140c connects the proximate end 140a and the distal end 140b to define a valve cavity 150 therebetween. It is to be appreciated that proximate and distal as used herein is for reference only and not intended on limiting an orientation or utilization of the disclosed embodiments.

The valve cavity 150 includes an outlet 160a, an inlet 160b, an axially extending motion hole 170a. The motion hole 170a is radially centered in the proximate end 140a of the valve housing 130, between the valve cavity 150 and an axial proximate exterior surface 175 of the valve housing 130. The motion hole 170a is fluidly connected to the outlet 160a. An axially extending receiving volume 170b is a radially centered hole extends from the valve cavity 150, partially through the distal end 140b of the valve housing 130. In an embodiment, the outlet 160a extends in a radial direction in the proximate end 140a of the valve housing 130, axially between an exterior side of the valve housing 130 and the motion hole 170a. The inlet 160b may comprise a plurality of axially extending through-holes disposed circumferentially and/or radially about the receiving volume 170b. During normal use, when the valve 100 is closed, the outlet 160a in the valve housing 130 is fluidly sealed from the valve cavity 150, the gas supply container 110 is filled (charged), and the valve cavity 150 is at the same pressure as the gas supply container 110.

The valve 100 includes a poppet 180. The poppet 180 includes a first stem that is an axially extending proximate stem 190a disposed within the motion hole 170a. A second stem is an axially extending distal stem 190b disposed within the receiving volume 170b. A center body 200 is axially intermediate the proximate stem 190a and distal stem 190b and disposed within the valve cavity 150. The poppet 180 is moveable between a first position which is an opened position (same as FIG. 3b) and a second position which is a closed position (FIG. 4). When the poppet 180 is at the opened position, the center body 200 of the poppet 180 is axially spaced from the proximate end of the valve housing 130 and more specifically from an axial distal segment (distal segment) 202 of the motion hole 170a. The center body 200 is also axially spaced from the axial distal end of the valve housing 130 within the valve cavity 150. An axial proximate portion 210a of the proximate stem 190a is substantially within the motion hole 170a when the poppet 180 is in the opened position.

When the poppet 180 is at the closed position, the center body 200 is axially against the distal segment 202 of the motion hole 170a so that the outlet 160a is fluidly sealed. Further, the proximate portion 210a of the proximate stem 190a axially extends from the motion hole 170a, beyond the proximate exterior surface 175 of the valve housing 130. The valve 100 is configured so that at least an axial distal portion 210b of the distal stem 190b is within the receiving volume 170b throughout a complete stroke span S1 of the valve 100, and the distal stem 190b does not axially bottom-out in the receiving volume 170b during the stroke of the valve 100.

The valve 100 includes a manually actuated lever assembly (lever assembly) 220 mounted, for example by screws 230, to the proximate exterior surface 175 of the valve housing 130. The lever assembly 220 is configured to operationally engage the proximate portion 210a of the proximate stem 190a to selectively move the poppet 180 from the closed position to the opened position, to thereby open the valve 100. For example, a lever arm 240 extends in opposing directions from a fulcrum 250 of the lever assembly 220 to define an input side 260a and an output side 260b. The output side 260b is operationally positioned against the proximate portion 210a the proximate stem 190a, and spaced by a predetermined axial clearance C1 to avoid accidentally engaging the poppet 180 (same as FIGS. 3a, 3c). The clearance C1 is provided by an axial proximate biasing member 270a that urges the lever assembly 220 away from engaging the poppet 180. The proximate biasing member 270a may be a torsional spring.

The input side 260a of the lever arm 240 is configured for being manually biased, for example by a pull cable 275, in the proximate direction, to manually advance the output side 260b against the poppet 180. This action axially advances the poppet 180 in the distal direction to thereby open the valve 100 (same as FIG. 3b). In use, the lever assembly 220 may be enclosed within a structural cover 285 (illustrated as removed from the valve 100 in FIG. 4, and wherein when attached is the same as FIG. 3a) to avoid unintended actuation.

In the embodiment illustrated in FIG. 4, an axial distal biasing member (distal biasing member) 270b is disposed between a second surface of the valve cavity 150, which is an axial distal surface 286b of the valve cavity 150, and the distal side 290b of the center body 200 of poppet 180. The distal biasing member 270b is configured to move the poppet 180 from the opened position to the closed position, to thereby close the valve 100, that is, resetting the valve 100. The distal biasing member 270b may be a plurality of compression springs. The compression springs function to reset the valve 100 once enough gas has escaped from the gas supply container 110 to diminish pressure tending to maintain the opened state of the valve 100.

The valve system includes a plurality of o-ring seals (generally referred to as 300) that prevent gas from escaping from around the valve housing 130. A first o-ring which is an axial proximate o-ring 300a is engagingly disposed between the proximate stem 190a of the poppet 180 and the motion hole 170a. The proximate o-ring 300a is within a first groove which is an axial proximate groove 310a formed in the motion hole 170a. Further, the proximate o-ring 300a is located axially within the valve 100 between the outlet 160a and the proximate exterior surface 175 of the valve housing 130. A second o-ring which is an axial distal o-ring (distal o-ring) 300b is disposed between the distal stem 190b of the poppet 180 and the receiving volume 170b of the valve housing 130. The distal o-ring 300b is within a second groove which is an axial distal groove 310b formed within the distal stem 190b of the poppet 180.

An annular seal land 320a at the distal segment 202 of the motion hole 170a operationally engages, for example by pressing against, an annular body seal 320b disposed in an annular groove 330 formed in the proximate side 290a of the center body 200. The center body 200 of the poppet 180 is disc shaped, having a cross-sectional area that is larger than the distal stem 190b, and the annular body seal 320b defines a planar profile for the proximate side 290a of the center body 200. The annular body seal 320b is soft relative to a hard surface of the annular seal land 320a. This configuration fluidly seals the valve cavity 150 from the outlet 160a of the valve housing 130 when the valve 100 is closed. The annular body seal 320b may be a polymer seal to achieve a leak tightness over wide range of operating temperatures.

The valve 100 may further include an axial distal flange (distal flange) 340 configured for being positioned against the gas supply container 110 and secured thereto with, for example screws 345. A flange o-ring 350 may be provided for operationally engaging the distal flange 340 and the gas supply container 110. A flange groove 360 may be formed in the distal flange 340 for seating the flange o-ring 350.

The outlet 160a fluidly connects with the motion hole 170a between the annular seal land 320a and the proximate o-ring 300a, and the motion hole 170a has a frustoconical profile therebetween, diverging toward the distal segment 202 of the motion hole 170a, for example at the annular seal land 320a. This configuration defines an inner diameter D1 of the annular seal land 320a. An annular boss 370 extends distally from a first surface of the valve cavity 150, which is an axial proximate surface 286a of the valve cavity 150 to form the distal segment 202 of the motion hole 170a. A radial outer profile of the annular boss 370 converges toward the distal segment 202, thereby defining an outer diameter D2 of the annular seal land 320a at the distal segment 202 of the motion hole 170a. It is to be appreciated that a radial inner profile of the annular boss 370 forms the frustoconical profile in the motion hole 170a that extends between the outlet 160a and the annular seal land 320a.

Turning to FIGS. 5a-5c, further disclosed is a method of operating the valve 100. As illustrated in FIG. 5a, the method includes block 510 of positioning, in the opened position, the poppet 180 of the valve 100. The method includes block 520 of moving the poppet 180 from the opened position to the closed position, for example to close or reset the valve 100. In such configuration, the center body 200 is against the distal segment 202 of the motion hole 170a so that the outlet 160a for the valve housing 130 is fluidly sealed. In addition, in this configuration, and the proximate portion 210a of the proximate stem 190a extends from the motion hole 170a, beyond the proximate exterior surface 175 of the valve housing 130, so that the valve 100 may again be opened at a later time.

As illustrated in FIG. 5b, block 520 may include block 530 of removing the lever assembly 220 from the proximate exterior surface 175 of the valve housing 130 to access to the proximate tip orifice 280 of the proximate stem 190a with a threaded pin 282 (FIGS. 3a-3c). As illustrated in FIG. 5c, block 520 may include block 540, in lieu of block 530, of applying a biasing force to the distal side 290b of the center body 200 of the poppet 180 to move the poppet 180 from the opened position to the closed position (FIG. 4).

As further illustrated in FIG. 5a, the method may further include block 550 of moving the poppet 180 from the closed position to the opened position by engaging the lever assembly 220 to apply a biasing force to the proximate portion 210a of the proximate stem 190a. Block 550, for example, may be executed to open the valve 100 to perform a health test.

Accordingly, with the above disclosed embodiments, a valve 100 is provided in which pressure is balanced within the valve 100 utilizing internal seals which may be o-rings 300. The design minimizes a required net valve closing force Fc. As such, a manual actuation force Fa is reduced. The design also provides a relatively minimal overall valve size, and thus, is suitable for inflatables having a variety of different operating sizes and functioning with different flow and pressure requirements. A minimal amount of o-ring seals (o-rings) 300 are required to thereby minimize a likelihood of a leak. Moreover, utilizing a poppet 180 with an axial proximate (top) surface 290a enables the valve 100 to open relatively quickly and to relatively quickly obtain a desired flow rate of gas out of the valve 100. In addition, the valve 100 is resettable to a closed state without requiring a disassembly of the valve housing 130. With the utilization of compression springs as a distal biasing member 270b in one embodiment (FIG. 4), an automatic reset of the valve 100 may be obtained without any disassembly. The embodiments therefore enable the performance of health checks of the valve 100 at any time.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pneumatic inflation valve assembly, comprising:
a valve housing defining a valve cavity, the valve housing including an axial proximate end and an axial distal end, the proximate end including an outlet from the valve cavity and the distal end including an inlet into the valve cavity, the proximate end includes a motion hole formed through it, the distal end includes a receiving volume defined therein;
a poppet disposed in the valve cavity, the poppet including an axial proximate stem extending through the motion hole, an axial distal stem at least partially disposed in the receiving volume, the poppet being moveable within the valve cavity between an opened position and a closed position, wherein when the poppet is at the opened position the distal stem extends further into the receiving volume than when the poppet is at the closed position, and a poppet center body is axially spaced from the proximate end of the valve housing and the distal end of the valve housing, wherein the proximate stem includes an axial proximate tip orifice to engage with a tool to close the valve;
a lever assembly mounted to the proximate exterior surface of the valve housing, the lever assembly configured to operationally engage the proximate stem to selectively move the poppet from the closed position to the opened position, wherein the lever assembly includes an axial proximate biasing member that urges the lever assembly against engaging with the poppet, wherein the axial proximate biasing member is a torsional spring.

2. The assembly of claim 1, wherein the proximate tip orifice is a threaded blind-hole.

3. The assembly of claim 1, further comprising an axial distal biasing member disposed between an axial distal surface of the valve cavity and an axial distal side of the center body of the poppet, the distal biasing member configured to move the poppet from the opened position to the closed position, to thereby close the valve.

4. The assembly of claim 1, further comprising a plurality of seal members, including:
an axial proximate O-ring in the motion hole, operationally engaging the proximate stem and the motion hole; and
an axial distal O-ring, operationally engaging the distal stem and the receiving volume; and
an annular body seal for the poppet operationally engaging an axial proximate side of the center body and an annular seal land at a distal segment of the motion hole.

5. The assembly of claim 4, further comprising an axial distal flange for being positioned against a gas supply container and a flange o-ring for operationally engaging the distal flange and the gas supply container.

6. The assembly of claim 4, wherein the center body of the poppet is disc shaped, having a cross-sectional area that is larger than the distal stem.

7. The assembly of claim 6, wherein the outlet fluidly connects with the motion hole between the annular seal land and the proximate o-ring.

8. The assembly of claim 7, wherein the motion hole has a frustoconical profile between the outlet and the annular seal land which diverges toward the annular seal land, thereby defining an inner diameter of the annular seal land.

9. The assembly of claim 8, wherein an annular boss extends distally from an axial proximate surface of the valve cavity, wherein an outer profile of the annular boss converges toward the distal segment of the motion hole, thereby defining an outer diameter of the annular seal land.

10. The assembly of claim 6, wherein:
a contact surface area between the annular body seal for the poppet and the annular seal land is AP0;
a contact surface area between the proximate o-ring and the poppet is AP1;
a contact surface area between the distal o-ring and the poppet is AD1;
wherein:
AP0>AD1; and
a cross-sectional area of the distal stem is greater than a cross-sectional area of the proximate stem, whereby AD1>AP1.

11. An egress system of an aircraft, comprising:
an evacuation slide;
a gas supply container to inflate the evacuation slide; and
a pneumatic inflation valve assembly fluidly connecting the gas supply container to the evacuation slide, the assembly including:
a valve housing defining a valve cavity, the valve housing including an axial proximate end and an axial distal end, the proximate end including an outlet from the valve cavity and the distal end including an inlet into the valve cavity, the proximate end includes a motion hole formed through it, the distal end includes a receiving volume defined therein;
a poppet disposed in the valve cavity, the poppet including an axial proximate stem extending through the motion hole, an axial distal stem at least partially disposed in the receiving volume, the poppet being moveable within the valve cavity between an opened position and a closed position, wherein when the poppet is at the opened position the distal stem is displaced further into the receiving volume than when the poppet is at the closed position, and a poppet center body is axially spaced from the proximate end of the valve housing and the distal end of the valve housing, wherein the proximate stem includes an axial proximate tip orifice to engage with a tool to close the valve; and
a lever assembly mounted to the proximate exterior surface of the valve housing, the lever assembly configured to operationally engage the proximate stem to selectively move the poppet from the closed position to the opened position, wherein the lever assembly includes an axial proximate biasing member that urges the lever assembly against engaging with the poppet, wherein the axial proximate biasing member is a torsional spring.

12. The system of claim 11, comprising:
a lever assembly mounted to the proximate exterior surface of the valve housing,
the lever assembly configured to operationally engage the proximate stem to selectively move the poppet from the closed position to the opened position.

13. A method of operating a pneumatic inflation valve assembly,
the pneumatic inflation valve assembly including:
a valve housing defining a valve cavity, the valve housing including an axial proximate end and an axial distal end, the proximate end including an outlet from the valve cavity and the distal end including an inlet into the valve cavity, the proximate end includes a motion hole formed through it, the distal end includes a receiving volume defined therein;
a poppet disposed in the valve cavity, the poppet including an axial proximate stem extending through the motion hole, an axial distal stem at least partially disposed in the receiving volume, the poppet being moveable within the valve cavity between an opened position and a closed position, wherein when the poppet is at the opened position the distal stem extends further into the receiving volume than when the poppet is at the closed position, and a poppet center body is axially spaced from the proximate end of the valve housing and the distal end of the valve housing, wherein the proximate stem includes an axial proximate tip orifice to engage with a tool to close the valve; and
a lever assembly mounted to the proximate exterior surface of the valve housing, the lever assembly configured to operationally engage the proximate stem to selectively move the poppet from the closed position to the opened position, wherein the lever assembly includes an axial proximate biasing member that urges the lever assembly against engaging with the poppet, wherein the axial proximate biasing member is a torsional spring:
the method comprising:
positioning the poppet of the valve in the opened position, wherein the poppet center body of the poppet in the valve cavity of the valve housing is spaced from the axial distal end of the valve housing and the axial proximate end of the valve housing, and the axial distal stem of the poppet extends into the receiving volume in the axial distal end of the valve housing; and
moving the poppet from the opened position to the axial closed position, wherein the poppet center body is positioned to fluidly seal the motion hole of the axial proximate end of the valve housing and the axial distal stem of the poppet extends into the receiving volume in the axial distal end of the valve housing, wherein when the poppet is at the opened position the distal stem extends further into the receiving volume than when the poppet is at the closed position.

14. The method of claim 13, wherein moving the poppet from the opened position to the closed position comprises:
removing the lever assembly from the proximate exterior surface of the valve housing to access the proximate portion of the proximate stem; and
applying a biasing force to the proximate portion of the proximate stem to move the poppet from the opened position to the closed position.

15. The method of claim 14, further comprising:
moving the poppet from the closed position to the opened position by engaging the lever assembly to apply a biasing force to the proximate stem when the proximate stem axially extends from the motion hole, axially beyond the proximate end of the valve housing.

16. The method of claim 15, wherein moving the poppet from the opened position to the closed position comprises:
applying a biasing force to an axial distal side of the center body of the poppet to move the poppet from the opened position to the closed position.

* * * * *